(12) United States Patent
James

(10) Patent No.: US 12,131,568 B2
(45) Date of Patent: *Oct. 29, 2024

(54) IMAGE PROCESSING-BASED WEIGHT ESTIMATION FOR AQUACULTURE

(71) Applicant: TidalX AI Inc., San Ramon, CA (US)

(72) Inventor: Barnaby John James, Los Gatos, CA (US)

(73) Assignee: TidalX AI Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,974

(22) Filed: Mar. 24, 2023

(65) Prior Publication Data

US 2023/0230409 A1    Jul. 20, 2023

Related U.S. Application Data

(63) Continuation of application No. 17/094,275, filed on Nov. 10, 2020, now Pat. No. 11,615,638.

(51) Int. Cl.
*G06V 40/10* (2022.01)
*A01K 61/95* (2017.01)
(Continued)

(52) U.S. Cl.
CPC .............. *G06V 40/10* (2022.01); *G01G 9/00* (2013.01); *G06T 7/285* (2017.01); *G06T 7/62* (2017.01);
(Continued)

(58) Field of Classification Search
CPC .... G06V 40/10; A01K 61/95; A01K 2227/40; G01G 9/00; G06T 7/62; G06T 2207/10021
See application file for complete search history.

(56) References Cited

U.S. PATENT DOCUMENTS 10,191,489 B1 * 1/2019 Rapoport ............. G05D 1/0692
2010/0198023 A1    8/2010 Yanai et al.
(Continued)

FOREIGN PATENT DOCUMENTS

CL    2019000039 A1    3/2019
CN       110125025       8/2019
(Continued)

OTHER PUBLICATIONS

[No Author Listed], "2020 The State of World Fisheries and Aquaculture," Food and Agriculture Organization of the United Nations, 2020, 224 pages.
(Continued)

*Primary Examiner* — Vincent Rudolph
*Assistant Examiner* — Raphael Schwartz
(74) *Attorney, Agent, or Firm* — Fish & Richardson P.C.

(57) ABSTRACT

Methods, systems, and apparatus, including computer programs encoded on computer-storage media, for fish weight estimation based on fish tracks identified in images. In some implementations, a method includes obtaining images of fish enclosed in a fish enclosure, identifying fish tracks shown in the images of the fish, determining a quality score for each of the fish tracks, selecting a subset of the fish tracks based on the quality scores, determining a representative weight of the fish in the fish enclosure based on weights of the fish shown in the subset of the fish tracks, and outputting the representative weight for display or storage at a device connected to the one or more processors.

20 Claims, 4 Drawing Sheets

(51) Int. Cl.
  *G01G 9/00* (2006.01)
  *G06T 7/285* (2017.01)
  *G06T 7/62* (2017.01)
(52) U.S. Cl.
  CPC .......... *A01K 61/95* (2017.01); *A01K 2227/40* (2013.01); *G06T 2207/10021* (2013.01)

(56) References Cited

U.S. PATENT DOCUMENTS

| | | | |
|---|---|---|---|
| 2015/0302241 | A1 | 10/2015 | Eineren et al. |
| 2019/0021292 | A1 | 1/2019 | Hayes |
| 2019/0228218 | A1* | 7/2019 | James .................. G06T 7/62 |
| 2019/0340440 | A1 | 11/2019 | Atwater et al. |
| 2021/0072017 | A1 | 3/2021 | Kitagawa |

FOREIGN PATENT DOCUMENTS

| | | |
|---|---|---|
| JP | 2002243527 | 8/2002 |
| JP | 6401411 | 10/2018 |
| JP | 2020085609 | 6/2020 |
| NO | 20160199 | 8/2017 |
| NO | 345829 | 10/2019 |
| WO | WO2012081990 | 6/2012 |
| WO | WO 2016/023071 | 2/2016 |
| WO | WO 2017/001971 | 1/2017 |
| WO | WO2017137896 | 8/2017 |
| WO | WO 2017/204660 | 11/2017 |
| WO | WO2018011745 | 1/2018 |
| WO | WO 2019/188506 | 10/2019 |
| WO | WO 2019/212807 | 11/2019 |
| WO | WO 2019/232247 | 12/2019 |
| WO | WO 2020/023467 | 1/2020 |

OTHER PUBLICATIONS

Aunsmo et al., "Accuracy and precision of harvest stock estimation in Atlantic salmon farming," Aquaculture, Mar. 2013, 369(399):113-118.
Aunsmo et al., "Field validation of growth models used in Atlantic salmon farming," Aquaculture, Mar. 2014, 428(429):249-257.
Boldt et al., "Development of stereo camera methodologies to improve pelagic fish biomass estimates and inform ecosystem management in marine waters," Fisheries Research, 2018, 198:66-77.
Chan et al., "Image processing for underwater measurement of salmon biomass," IEE Colloquium on Underwater Applications of Image Processing, Mar. 25, 1998, 1998(217):8 pages.
Costello et al., "The future of food from the sea," Nature, Dec. 2020, 588:95-100.
Crippa et al., "Food systems are responsible for a third of globalanthropogenic GHG emissions," Nature Food, Mar. 2021, 2:198-209.
Fore et al., "Precision fish farming: A new framework to improve production in aquaculture," Biosystems Engineering, Nov. 2017, 173:176-193.
Fry et al., "Feed conversion efficiency in aquaculture: do we measure it correctly?," Environ. Res. Lett., Feb. 2018, 13:024017.
Harvey et al., "The accuracy and precision of underwater measurements of length and maximum body depth of southern bluefin tuna (*Thunnus maccoyii*) with a stereo-video camera system," Fisheries Research, Sep. 2003, 63(3):315-326.
Hilborn et al., "The environmental cost of animal source foods," Front Ecol Environ, 2018, 16(6):329-335.
Hockaday et al., "Using truss networks to estimate the biomass of Oreochromis niloticus, and to investigate shape characteristics," Journal of Fish Biology, May 2000, 57:981-1000.
International Search Report and Written Opinion in International Appln. No. PCT/US2021/057359, dated Feb. 14, 2022, 14 pages.
Kang et al., "A Study on the Search of Optimal Aquaculture farm condition based on Machine Learning," The Journal of the Institute of Internet, Broadcasting and Communication, Apr. 2017, 17(2):135-140.
Macleod et al., "Quantifying and mitigating greenhouse gas emissions from global aquaculture," FAO Fisheries and Aquaculture Technical Paper, Mar. 2019, 626:50 pages.
Maloy et al., "A spatio-temporal recurrent network for salmon feeding action recognition from underwater videos in aquaculture," Computers and Electronics in Agriculture, Nov. 12, 2019, 9 pages.
Murray et al., "Using the H-index to assess disease priorities for salmon aquaculture," Preventive Veterinary Medicine, Apr. 2016, 126:199-207.
Odey, "AquaMesh—Design and Implementation of Smart Wireless Mesh Sensor Networks for Aquaculture," American Journal of Networks and Communications, Jul. 2013, 8 pages.
Office Action in Canadian Appln. No. 3,087,370, dated Aug. 4, 2021, 3 pages.
Office Action in Japanese Appln. No. 2020-531477, dated Aug. 27, 2021, 13 pages (with English translation).
Parker et al., "Fuel use and greenhouse gas emissions of world fisheries," Nature Climate Change, Apr. 2018, 8:333-337.
PCT International Search Report and Written Opinion in International Appln. PCT/US2021/023097, dated Jun. 4, 2021, 45 pages.
Pérez et al., "Automatic measurement of fish size using stereo vision," 2018 IEEE International Instrumentation and Measurement Technology Conference, May 2018, 6 pages.
Petrov et al., "Overview of the application of computer vision technology in fish farming," E3S Web of Conferences, 2020, 175:02015.
Pettersen et al., "Detection and classification of lepeophterius salmonis (krøyer, 1837) using underwater hyperspectral imaging," Aquacultural Engineering, Nov. 2019, 87:102025.
Rahman et al., "Developing an Ensembled Machine Learning Prediction Model for Marine Fish and Aquaculture Production," Sustainability, 2021, 13:9124.
Saberloon et al., "Application of Machine Vision Systems in Aquaculture with Emphasis on Fish: State-of-the-Art and Key Issues," Reviews in Aquaculture, Dec. 2017, 9:369-387.
Shafait et al., "Towards automating underwater measurement of fish length: a comparison of semi-automatic and manual stereovideo measurements," ICES Journal of Marine Science, 2017, 13 pages.
towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.
Troell et al., "Does aquaculture add resilience to the global food system?," PNAS, Sep. 2014, 111(37):13257-13263.
Wang, "Robust tracking of fish schools using CNN for head identification," Multimedia Tools and Applications, Nov. 2017, 20 pages.
Yang et al., "Deep learning for smart fish farming: applications, opportunities and challenges," Reviews in Aquaculture, 2021, 13(1):66-90.
Office Action in Japanese Appln. No. 2023-520288, dated Aug. 22, 2022, 8 pages (with English translation).

\* cited by examiner

IMAGE PROCESSING-BASED WEIGHT ESTIMATION FOR AQUACULTURE

CROSS-REFERENCE TO RELATED APPLICATIONS

This application is a continuation of U.S. application Ser. No. 17/094,275, filed Nov. 10, 2020. The contents of the prior application is incorporated herein by reference in its entirety.

FIELD

This specification relates to enhanced computer vision techniques, including, for example, those that are used to improve the accuracy of estimates that are generated by aquaculture systems.

BACKGROUND

Aquaculture involves the farming of aquatic organisms, such as fish, crustaceans, or aquatic plants. In aquaculture, and in contrast to commercial fishing, freshwater and saltwater fish populations are cultivated in controlled environments. For example, the farming of fish can involve raising fish in tanks, fish ponds, or ocean enclosures.

Aquaculture farmers have found that it can be difficult to accurately estimate the weight of fish prior to harvesting. A manual process of catching and weighing a sample set of fish is often used to estimate the weight of a larger number of fish in an enclosure or pen, however such a process can be time-consuming, inaccurate, and requires substantial financial, logistical, and human resources.

SUMMARY

In general, innovative aspects of the subject matter described in this specification relate to fish weight estimation based on fish tracks identified in images. A fish track may refer to a path of a fish, in relation to a camera, across one or more images. For example, a single fish track may be an appearance of a single fish swimming closer to a camera in ten images. In another example, a single fish track may be an appearance of a single fish swimming into view of a camera for two images.

Images of fish within a fish enclosure may be captured by an underwater camera and the weights of fish may be estimated from the images. The weight estimated from the images may be used to estimate a representative weight, e.g., average, median, etc., for fish in the fish enclosure. The representative weight may be used to determine whether the fish are growing as expected or whether there are any problems with the fish. For example, the representative weight may be less than expected, which may indicate that the fish should be feed more or the fish should be allowed more time to grow.

A representative weight of fish in the fish enclosure may be determined by sampling a random subset of the weights estimated from images, and continuing to randomly add more of the weights to the subset until the representative weight of the subset stabilizes. For example, given three thousand estimated weights of fish, taking the average estimates of fish weights in a random order may result in a stable average after averaging one thousand seven hundred weights of fish.

However, a more efficient approach to determining a representative weight of the fish in the fish enclosure may be to prioritize sampling higher quality estimated weights. For example, a quality of each weight's estimate may be determined, and then weights may be selected for averaging in descending order of quality until the average weight of the subset stabilizes after averaging one thousand two hundred weights of fish. Accordingly, the more efficient approach for determining a representative weight may result in less computations necessary and reduced power consumption for computation. Additionally, a representative weight determined from a subset of higher quality weight estimates may be more accurate than an average weight determined from a random subset of weight estimates.

In some implementations, in response to the representative weight being less than expected, an automated fish feeder may be controlled to feed the fish more by increasing a rate that fish feed is dispensed and/or increasing a time that fish feed is dispensed. In some implementations, in response to the representative weight reaching a harvest threshold, an automated fish harvester may be controlled to begin harvesting the fish.

One innovative aspect of the subject matter described in this specification is embodied in a method that includes obtaining images of fish enclosed in a fish enclosure, identifying, by one or more processors, fish tracks shown in the images of the fish, determining, by the one or more processors, a quality score for each of the fish tracks based on at least one of a minimum camera distance of the fish tracks, a maximum camera distance of the fish tracks, image length of the fish tracks, stereo consistency of the fish tracks, detection confidence of the fish tracks, or depth variation of the fish tracks, selecting, by the one or more processors, a subset of the fish tracks based on the quality scores, determining, by the one or more processors, a representative weight of the fish in the fish enclosure based on weights of the fish shown in the subset of the fish tracks, and outputting the representative weight for display or storage at a device connected to the one or more processors.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some aspects identifying, by one or more processors, fish tracks shown in the images of the fish includes determining that a fish shown in a first image of the images is shown in a subsequently captured second image of the images. In certain aspects, obtaining images of fish enclosed in a fish enclosure includes instructing an underwater camera to capture the images at different depths in the fish enclosure and receiving the images from the underwater camera. In some implementations, determining, by the one or more processors, a representative weight of the fish in the fish enclosure based on weights of the fish shown in the subset of the fish tracks includes determining the weights of the fish based on apparent sizes of the fish in the images.

In certain aspects, actions include determining that the representative weight satisfies a harvesting criteria and triggering harvesting of the fish in the fish enclosure. In some aspects, determining a representative weight of the fish in the fish enclosure based on weights of the fish shown in the subset of the fish tracks includes selecting, by the one or more processors, a second subset from the fish tracks based on the quality scores, where the fish tracks selected in the second subset are in the subset of the fish tracks, determining, by the one or more processors, a second representative weight of the fish in the enclosure from weights of fish shown in the subset of the fish tracks in the second subset, and determining, by the one or more processors, that a difference between the representative weight and the second representative weight satisfies a stability criteria.

In some implementations, determining, by the one or more processors, that a difference between the representative weight and the second representative weight satisfies a stability criteria includes determining that the difference between the representative weight and the second representative weight is below a threshold weight. In certain aspects, determining, by the one or more processors, that a difference between the representative weight and the second representative weight satisfies a stability criteria includes determining that a first distribution of the weights of fish shown in the fish tracks in the subset is stable relative to a second distribution of the weights of fish shown in the fish tracks in the second subset.

In some aspects, selecting, by the one or more processors, a second subset from the fish tracks based on the quality scores includes determining a ranking the fish tracks based on the quality scores and selecting, as the second subset, a predetermined number of the fish tracks based on the ranking. In some implementations, selecting, by the one or more processors, a subset of the fish tracks based on the quality scores includes selecting both a second predetermined number of remaining fish tracks of the fish tracks based on the ranking and the fish tracks in the second subset. In certain aspects, the representative weight includes an average weight.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
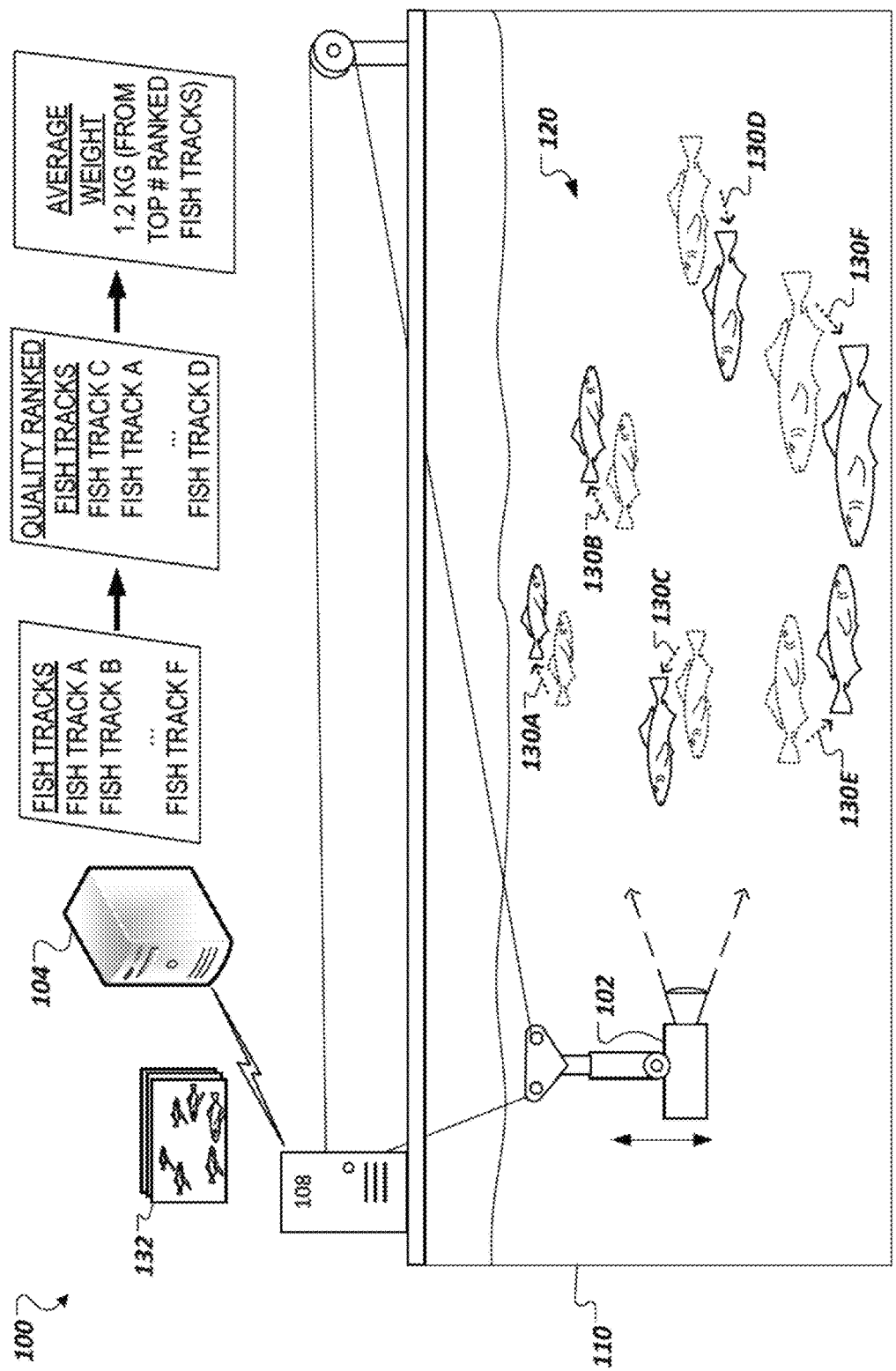
FIG. 1 is a diagram of an example system for fish weight estimation based on fish tracks identified in images.

FIG. 1 is a diagram of an example system 100 for fish weight estimation based on fish tracks identified in images. An enclosure 110 contains livestock 120. The livestock 120 can be aquatic creatures which swim freely within the confines of the enclosure 110. In some implementations, the aquatic livestock 120 stored within the enclosure 110 can include finfish or other aquatic lifeforms. The livestock 120 can include for example, juvenile fish, koi fish, sharks, salmon, and bass, to name a few examples. Where the livestock 120 is fish, the enclosure 110 may be referred to as a fish enclosure.

In addition to the aquatic livestock, the enclosure 110 contains water, e.g., seawater, freshwater, or rainwater, although the enclosure can contain any fluid that is capable of sustaining a habitable environment for the aquatic livestock. In some implementations, the system 100 is anchored to a structure such as a pier, dock, or buoy instead of being confined within the enclosure 110. For example, instead of being confined within the enclosure 110, the livestock 120 can be free to roam a body of water, and the system 100 can monitor livestock within a certain area of the body of water.

The system 100 includes a sensor subsystem 102 that generates sensor data, a weight subsystem 104 that determines an average weight for the livestock 120 based on the sensor data, and a winch subsystem 108 that moves the sensor subsystem 102. The sensor subsystem 102 includes a camera which can be fully submerged in the enclosure 110. The position of the sensor subsystem 102 within the enclosure 110 is determined by instructions generated by the weight subsystem 104.

The sensor subsystem 102 may be waterproof and can withstand the effects of external forces, such as typical ocean currents, without breaking. The system 100 can additionally store the sensor data captured by the sensor subsystem 102 in a sensor data storage. In some implementations, the system 100 can store media, such as video and images, as well as sensor data, such as ultrasound data, thermal data, and pressure data, to name a few examples. Additionally, the sensor data can include GPS information corresponding to a geolocation at which the sensor subsystem captured the sensor data.

The winch subsystem 108 receives the instructions and activates one or more motors to move the sensor subsystem 102 to the position corresponding to the instructions. The winch subsystem 108 can include one or more motors, one or more power supplies, and one or more pulleys to which the cord, which suspends the sensor subsystem 102, is attached. Although the winch subsystem 108 includes a single cord, any configuration of one or more cords and one or more pulleys that allows the sensor subsystem 102 to move and rotate, as described herein, can be used.

The winch subsystem 108 receives an instruction from the weight subsystem 104 and activates the one or more motors to move the cord. The cord, and the attached sensor subsystem 102, can be moved along the x, y, and z-directions, to a position corresponding to the instruction.

A motor of the winch subsystem 108 can be used to rotate the sensor subsystem 102 to adjust the horizontal angle and the vertical angle of the sensor subsystem. A power supply can power the individual components of the winch subsystem. The power supply can provide AC and DC power to each of the components at varying voltage and current levels. In some implementations, the winch subsystem can include multiple winches or multiple motors to allow motion in the x, y, and z-directions.

One or both of the sensor subsystem 102 and the winch subsystem 108 can include inertial measurement devices for tracking motion and determining position of the sensor subsystem 102, such as accelerometers, gyroscopes, and magnetometers. The winch subsystem 108 can also keep track of the amount of cord that has been spooled out and reeled in, to provide another input for estimating the position of the sensor subsystem 102. In some implementations the winch subsystem 108 can also provide torques applied to the cord, to provide input on the position and status of the sensor subsystem 102. In some implementations, the sensor subsystem 102 can be attached to an autonomous underwater vehicle (AUV), e.g., a tethered AUV.

The weight subsystem 104 determines a representative weight of the livestock 120 based on sensor data from the sensor subsystem 102. For example, the sensor subsystem 102 determines an average weight of 1.2 kilograms (KG) per fish based on five hundred images of fish 132 captured by the sensor subsystem 102.

The weight subsystem 104 determines the representative weight by identifying fish tracks 130A-F shown in the images of the fish. For example, the weight subsystem 104 may identify a first fish track, Fish Track C 130C, by recognizing that a single fish swam closer to a camera in five images consecutively captured by the sensor subsystem 102. In another example, the weight subsystem 104 may identify a second fish track, Fish Track A 130A, by recognizing that a single fish swam quickly from a left edge of a view of a camera of the sensor subsystem 102 to a right edge of the view of the camera of the sensor subsystem 102 in two consecutively captured images.

The weight subsystem 104 may rank the fish tracks that were identified based on quality scores. For example, the weight subsystem 104 may determine a quality score of 90% for Fish Track C, a quality score of 80% for Fish Track A, and quality score of 5% for Fish Track D, and rank the fish tracks in descending order of quality from top to bottom so that Fish Track C is above Fish Track A, and Fish Track A is above Fish Track D. Various ways of generating a quality score are discussed more fully below.

The weight subsystem 104 may determine representative weights of fish shown in expanding subsets of the fish tracks until the representative weight stabilizes. For example, the weight subsystem 104 may determine that an average weight of 1.2 KG from the top ranked four hundred fish tracks is stable.

In some implementations, the weight subsystem 104 may learn a pattern for the sensor subsystem 102 to capture sensor data based on the subset of fish tracks when the representative weight stabilizes. For example, the weight subsystem 104 may learn where the sensor subsystem 102 was positioned fish enclosure 110 for the top ranked fish tracks, and then instruct the sensor subsystem 102 to capture more images at those positions and less images at other positions. In another example, the weight subsystem 104 may learn times of day when the sensor subsystem 102 captured images of the top ranked fish tracks, and then instruct the sensor subsystem 102 to capture more images at those times of day. In yet another example, the weight subsystem 104 may learn that fewer images are needed determine a representative weight and, in response, instruct the sensor subsystem 102 to capture fewer images.

The weight subsystem 104 may output the representative weight for display or storage at a device. For example, the weight subsystem 104 may output the average weight of 1.2 KG to a computer being used by a person. In another example, the weight subsystem 104 may output the average weight of 1.2 KG to a harvesting device that determines whether to harvest some or all of the fish based on the average weight.

In some implementations, the weight subsystem 104 may output the representative weight to an automated fish harvester that may determine that the representative weight has reached a harvest threshold and, in response, may begin harvesting the fish. In some implementations, the weight subsystem 104 may output the representative weight to an automated fish feeder that may determine the representative weight is less than expected and, in response, may increase a rate that fish feed is dispensed and/or increase a time that fish feed is dispensed. Additionally or alternatively, the weight subsystem 104 or the device the representative weight is output to may estimate growth rates over time to project harvest times, detect disease based on lack of growth or shape of distribution of weights, or estimate a condition factor of fish to assess fish health.

Figure 2A:
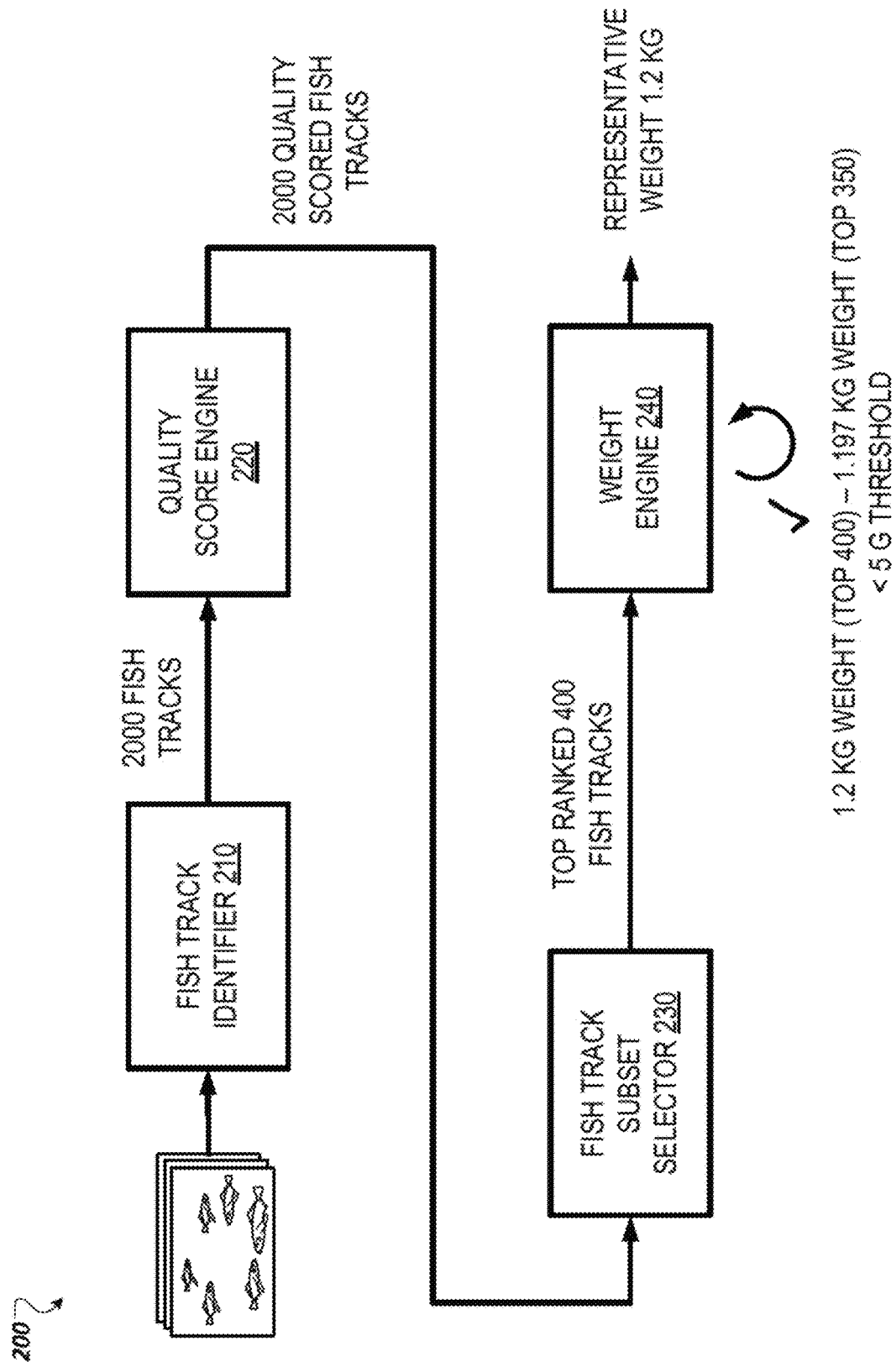
FIGS. 2A and 2B are diagrams of an example weight subsystem.
Figure 2B:
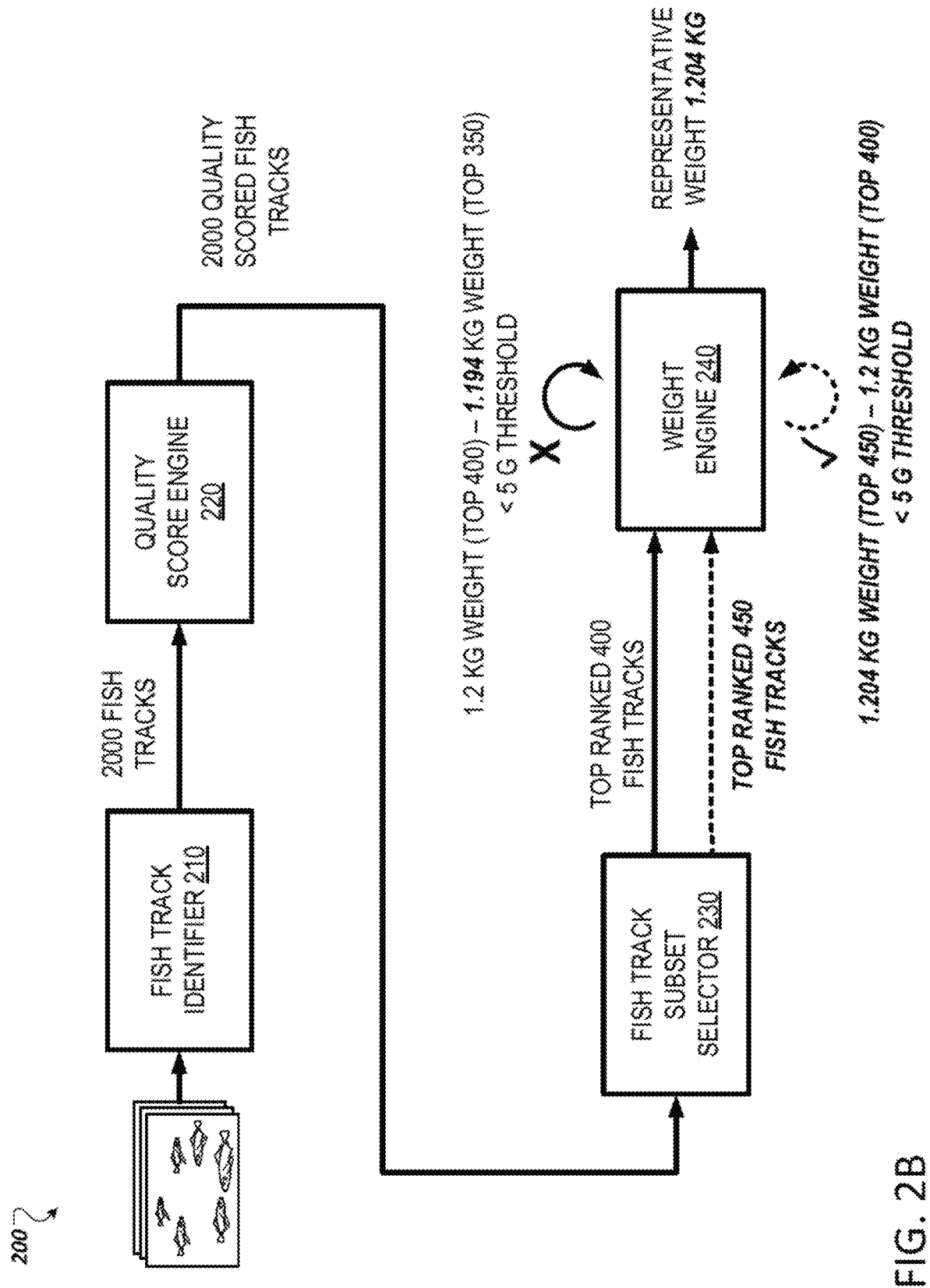

FIGS. 2A and 2B are diagrams of an example weight subsystem 200. The weight subsystem 200 may be the weight subsystem 104 shown in FIG. 1. The weight subsystem 200 includes a fish track identifier 210 that identifies fish tracks shown in images of fish, a quality score engine 220 that determines quality scores for the fish tracks, a fish track subset selector 230 that selects a subset of the fish tracks based on the quality scores, and an weight engine 240 that determines a representative weight based on the subset of the fish tracks.

The fish track identifier 210 identifies fish tracks shown in images of fish. For example, the fish track identifier 210 may receive five hundred images of fish and identify eight hundred fish tracks. Each fish track may correspond to an appearance of a fish in one or more images. For example, a first image may show five fish so there may be five fish tracks that correspond to the first image. In the example, a second image captured immediately after the single image may show three of the five fish in slightly different locations, one new fish, and not show the remaining two of the five fish. Accordingly, in the example, the first and second images may together show six fish tracks, where three fish tracks are show in both images, two fish tracks are shown in the first image and not in the second image, and one fish track is shown in the second image and not in the first image.

The quality score engine 220 may receive indications of the fish tracks identified by the fish track identifier 210 and determine a quality score for each fish track. For example, the quality score engine 220 may determine a quality score of 90%, 5%, and 80% for a respective first, second, and third fish track. Generally, the quality score engine 220 may determine quality scores based on a confidence that the fish track identifier 210 was actually able to track the same specific fish across multiple images, given that, among other things, there may be multiple fish, multiple poses of the same fish, and difficult lighting conditions in the images that may affect the ability to track a specific fish with high confidence across the images.

While the quality score engine 220 is shown separate from the fish track identifier 210, in some implementations, the fish track identifier 210 may perform the functionality described for the quality score determinator and instead determine quality scores for fish tracks and provide the scores and estimated weights from the fish tracks to the fish track subset selector 230.

The quality score engine 220 may determine quality scores based on one or more of a minimum camera distance of the fish tracks, a maximum camera distance of the fish tracks, an image length of the fish tracks, a stereo consistency of the fish tracks, a detection confidence of the fish tracks, or a depth variation of the fish tracks. For example, the quality score engine 220 may determine a quality score for each fish track based on one, two, all of the factors, or some other combination. The quality score engine 220 may additionally or alternatively consider different factors.

Minimum camera distance may refer to a closest distance a fish is from the sensor subsystem 102 as shown in any image of a fish track. For example, where a fish appears at ranges of three to ten feet away in images of a fish track, the minimum camera distance may be three feet. In another example, where a fish appears at ranges of four to seven feet away in images of a fish track, the minimum camera distance may be four feet. Fish tracks with lower minimum camera distances may correspond to higher quality scores as visual weight estimates may be assumed to be more accurate as more details of the fish may be visible.

Maximum camera distance may refer to a farthest distance a fish is from the sensor subsystem 102 as shown in any image of a fish track. For example, where a fish appears at ranges of three to ten feet away in images of a fish track, the maximum camera distance may be ten feet. In another example, where a fish appears at ranges of four to seven feet away in images of a fish track, the maximum camera distance may be seven feet. Fish tracks with higher maximum camera distances may correspond to higher quality scores as visual weight estimates may be assumed to be less accurate as details of the fish may be visible.

Image length may refer to a number of images that a particular fish track is shown. For example, where a fish appears in five consecutive images, the image length may be five. In another example, where a fish appears in two consecutive images, the image length may be two. Fish tracks with greater image length may correspond to higher quality scores as visual weight estimates may be assumed to be more accurate as the estimate are made from more images.

Stereo consistency may refer to difference in depth estimate between a left camera and a right camera. For example, where a left camera and right camera show a distance of an eye of a fish is five and six feet away, respectively, the stereo consistency may be one foot. In another example, where a left camera and right camera show a distance of an eye of a fish is four and four and a half feet away, respectively, the stereo consistency may be half a foot. Fish tracks with higher stereo consistency image length may correspond to lower quality scores as differences may reflect an error in recognition of features of the fish.

Detection confidence of the fish tracks may refer to a confidence that a fish track was correctly detected. For example, the detection confidence score may be 10% where the fish track identifier 210 is unsure whether the fish shown in two consecutive images is the same fish. In another example, the detection confidence score may be 90% where the fish track identifier 210 is fairly certain that the fish shown in two consecutive images is the same fish.

Additionally or alternatively, detection confidence of the fish tracks may refer to a confidence that a fish or pose of a fish was correctly detected. For example, the detection confidence score may be 10% where the fish track identifier 210 is unsure whether a fish is actually shown or that a fish is actually facing a camera. In another example, the detection confidence score may be 90% where the fish track identifier 210 is fairly certain that a fish is shown or that the face is facing a camera. Fish tracks with greater detection confidence may correspond to higher quality scores as the weight estimates may be assumed to be more accurate.

Depth variation of the fish tracks may refer to a standard deviation distance from a particular depth, e.g., an average depth at which the fish tracks are identified. For example, depth variation for a fish track may be greater for a fish track identified near a top or a bottom of the fish enclosure 120, and may be less for a fish track identified near a center of a fish enclosure 120. Higher depth variation in selected fish tracks may be desirable as it may correspond to a higher likelihood that varying sizes of fish are used for determining the representative weight.

The quality score engine 220 may determine, for each of the fish tracks, one or more of the minimum camera distance of the fish tracks, the maximum camera distance of the fish tracks, the image length of the fish tracks, the stereo consistency of the fish tracks, the detection confidence of the fish tracks, or the depth variation of the fish tracks. For example, the quality score engine 220 may determine an image length of five for a particular fish track based on determining that the fish track is shown in five images.

The fish track subset selector 230 may select a subset of the fish tracks based on the quality scores. For example, the fish track subset selector 230 may select the four hundred fish tracks with the highest quality scores. The fish track subset selector 230 may select an initial number of fish tracks, and then continually select more fish tracks until the representative weight of the selected fish tracks satisfies a stability criteria. For example, the fish track subset selector 230 may initially select three hundred fish tracks, and then continually select fifty more fish tracks until the average of the selected fish tracks satisfies a stability criteria.

In a more detailed example, the fish track subset selector 230 may select the top three hundred fish tracks and arrive at an average of 1.19 KG, then select the top three hundred fifty fish tracks and arrive at 1.197 KG, and then select top four hundred fish tracks and arrive at 1.2 KG, which satisfies a stability criteria.

In some implementations, the stability criteria may be that a difference between a representative weight from an earlier subset and a current subset is less than a threshold. For example, the threshold may be five grams, ten grams, twenty grams, or some other amount. Additionally or alternatively, the stability criteria may be that shapes of distributions of the weights are similar. For example, a Kolmogorov Smirnoff statistic or Kullback-Leibler Divergence may be determined for an earlier subset and a current subset and then compared to a threshold to determine whether the stability criteria is satisfied. In some implementations, the threshold and/or the number of fish tracks added to the subset each iteration may be tunable. For example, the threshold and number of fish tracks added may be increased when more accuracy is desired and the threshold and number of fish tracks added may be reduced when less accuracy is desired.

The weight engine 240 may determine a representative weight from the subset of fish tracks. For example, the weight engine 240 may determine an average weight of 1.2 KG. The weight engine 240 may determine the representative weight from the weights of the fish shown in the fish tracks in the subset. For example, the weight engine 240 may take the average of the four hundred weights for the four hundred fish tracks in the subset.

In some implementations, the weight engine 240 may determine a single estimated weight for each of the fish tracks in the subset and not determine estimated weights for fish tracks that have not yet been selected. For example, the weight engine 240 may generate a single 3D model of a fish from an appearance of the fish in five images of a fish track, and then estimate a weight from the 3D model. Estimating a weight for a fish track may be computationally expensive and, accordingly, the weight engine 240 may avoid estimating a weight for all the fish tracks by not estimating a weight for fish tracks that were not selected.

As described above, the weight engine 240 may determine the weight by determining that the representative weight of a current subset has stabilized relative to a prior subset. For example, as shown in FIG. 2A, the average weight engine 240 may determine that a difference of 0.003 KG between an average weight of 1.2 KG for a current subset of the top four hundred fish tracks and an average weight of 1.197 KG for an earlier subset of the top three hundred fifty fish tracks satisfies a stability criteria of less than five grams.

In another example, as shown in FIG. 2B, the weight engine 240 may determine that a difference of 0.006 KG between an average weight of 1.2 KG for a current subset of the top four hundred fish tracks and an average weight of 1.194 KG for an earlier subset of the top three hundred fifty fish tracks does not satisfy a stability criteria of less than five grams and, in response, then select the top four hundred fifty fish tracks and determine that a difference of 0.004 KG between an average weight of 1.2 KG for the top four fifty hundred fish tracks and an average weight of 1.194 KG for the top four hundred fish tracks satisfies a stability criteria of less than five grams.

Figure 3:
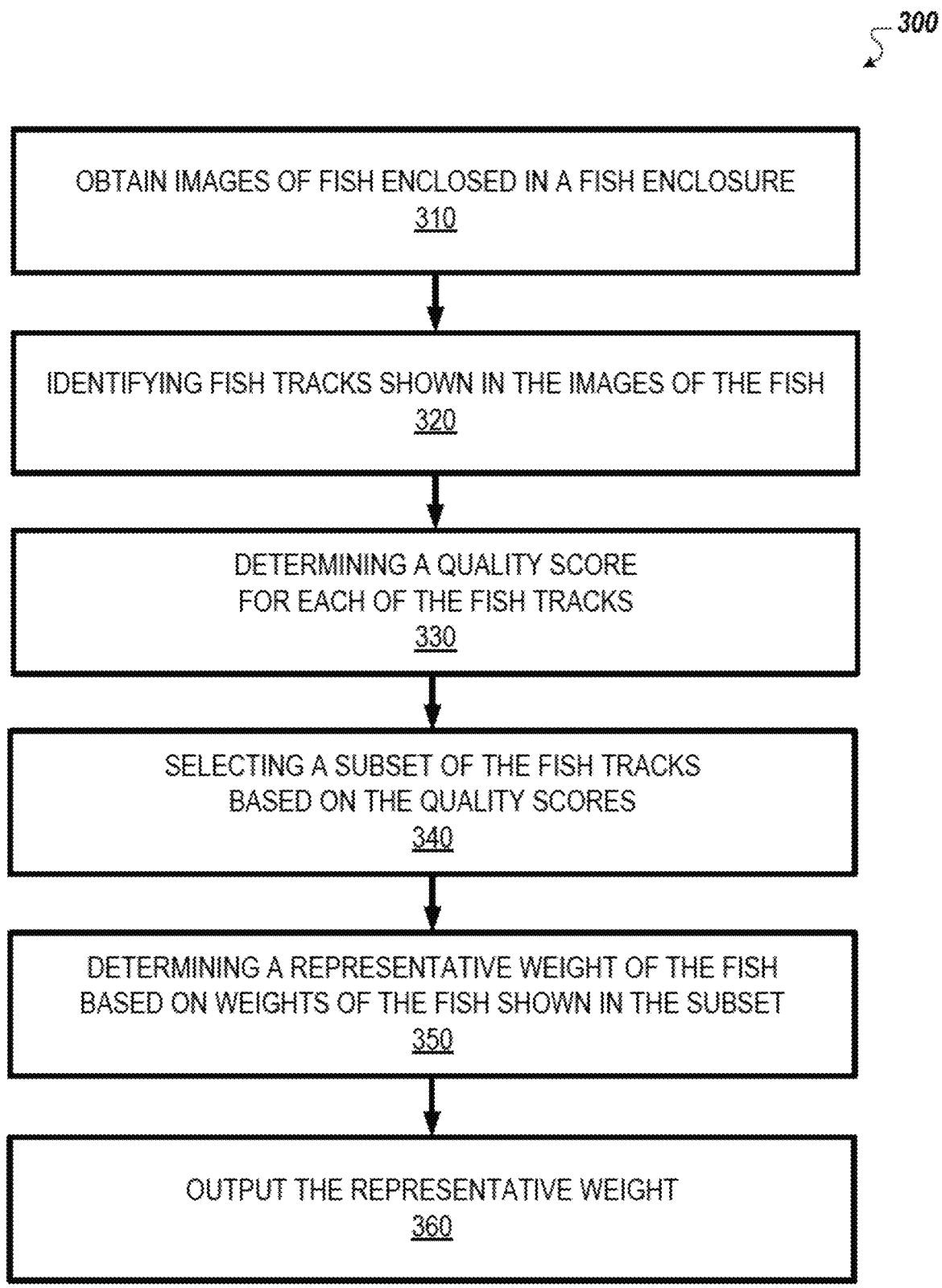
FIG. 3 is a flow diagram for an example process of fish weight estimation based on fish tracks identified in images.

FIG. 3 is a flow diagram for an example process 300 of fish weight estimation based on fish tracks identified in images. The example process 300 may be performed by various systems, including the weight subsystem 104 shown in FIG. 1 or the weight subsystem 200 shown in FIG. 2. Briefly, and as will be described further below, the process 300 includes obtaining images of fish enclosed in a fish enclosure (310), identifying fish tracks shown in the images of the fish (320), determining a quality score for each of the fish tracks (330), selecting a subset of the fish tracks based on the quality scores (340), determining a representative weight of the fish shown in the subset of the fish tracks (350), and outputting the representative weight (360).

The process 300 includes obtaining images of fish enclosed in a fish enclosure (310). For example, the fish track identifier 210 may receive two hundred images of the fish. In some implementations, obtaining images of fish enclosed in a fish enclosure includes instructing an underwater camera to capture the images at different depths in the fish enclosure and receiving the images from the underwater camera. For example, the weight subsystem 104 may instruct the sensor subsystem 102 to capture an image every second and instruct the winch subsystem 108 to slowly move the sensor subsystem 102 from a top of the fish enclosure 110 to the bottom, and then receive the images of the fish captured by the sensor subsystem 102. Fish that are different weights may prefer different depths. For example, smaller, lighter fish may prefer more shallow water than larger, heavier fish. Accordingly, moving the camera through different depths may provide images that better represent varying sizes of fish.

The process 300 includes identifying fish tracks shown in the images of the fish (320). For example, the fish track identifier 210 may identify a first fish track, Fish Track C, by recognizing that a single fish swam closer to a camera in five images consecutively captured by the sensor subsystem 102. In another example, the weight subsystem 104 may identify a second fish track, Fish Track A, by recognizing that a single fish quickly swam from a left edge of a view of a camera of the sensor subsystem 102 to a right edge of the view of the camera of the sensor subsystem 102 in two consecutively captured images.

In some implementations, identifying fish tracks shown in the images of the fish includes determining that a fish shown in a first image of the images is shown in a subsequently captured second image of the images. For example, the fish track identifier 210 may determine that a fish shown in the first image is the same fish shown in a second image based on one or more of recognizing white spots on the fish, a location of the fish, a pose of the fish, or a direction of movement of the fish, etc.

The process 300 includes determining a quality score for each of the fish tracks (330). For example, the quality score engine 220 may determine a quality score of 90% for Fish Track C, a quality score of 80% for Fish Track A, and quality score of 5% for Fish Track D. In some implementations, determining a quality score for each of the fish tracks is based on at least one of a minimum camera distance of the fish tracks, a maximum camera distance of the fish tracks, image length of the fish tracks, stereo consistency of the fish tracks, detection confidence of the fish tracks, or depth variation of the fish tracks.

For example, the quality score engine 220 may determine that for Fish Track C a minimum camera distance was one foot, a maximum camera distance was ten feet, an image length was five images, a stereo consistency indicates high matching, detection confidence is high, and a depth variation is high. In another example, the quality score engine 220 may determine that for Fish Track D a minimum camera distance was fifteen feet, a maximum camera distance was twenty feet, an image length was two images, a stereo consistency indicates low matching, detection confidence is low, and a depth variation is low.

The process 300 includes selecting a subset of the fish tracks based on the quality scores (340). For example, the fish track subset selector 230 may select a top ranked four hundred fish tracks. In some implementations, selecting a second subset from the fish tracks based on the quality scores includes determining a ranking the fish tracks based on the quality scores and selecting, as the second subset, a predetermined number of the fish tracks based on the ranking. For example, the fish track subset selector 230 may rank two thousand fish tracks in descending order based on quality score and then select three hundred fish tracks from the top.

In some implementations, selecting a subset of the fish tracks based on the quality scores includes selecting both a second predetermined number of remaining fish tracks of the fish tracks based on the ranking and the fish tracks in the second subset. For example, the fish track subset selector 230 may continually select fifty more of the next top fish tracks to add to the subset until the representative of the subset stabilizes.

The process 300 includes determining a representative weight of the fish shown in the subset of the fish tracks (340). For example, the weight engine 240 may determine an average weight of 1.2 KG. In some implementations, determining a representative weight of the fish in the fish enclosure based on weights of the fish shown in the subset of the fish tracks includes determining the weights of the fish based on apparent sizes of the fish in the images. For example, the weight engine 240 may determine the average weight of 1.2 KG based on taking the average of weights visually estimated for fish as shown in the images of fish.

In some implementations, determining a representative weight of the fish in the fish enclosure based on weights of the fish shown in the subset of the fish tracks includes selecting a second subset from the fish tracks based on the quality scores, where the fish tracks selected in the second subset are in the subset of the fish tracks, determining a second representative weight of the fish in the enclosure from weights of fish shown in the subset of the fish tracks in the second subset, and determining that a difference between the representative weight and the second representative weight satisfies a stability criteria. For example, the fish track subset selector 230 may select the top three hundred fifty top fish tracks, determine an average weight of 1.197 KG, and determine that a difference of 3 grams, between the average weight of 1.197 KG and the average weight of 1.2 KG from the top four hundred fish tracks, satisfies a stability criteria of less than five grams.

In some implementations, determining that a difference between the representative weight and the second representative weight satisfies a stability criteria includes determining that the difference between the representative weight and the second representative weight is below a threshold weight. For example, the stability criteria may be five, ten, twenty, or some other amount of grams that the difference should be less than.

In some implementations, determining that a difference between the representative weight and the second representative weight satisfies a stability criteria includes determining that a first distribution of the weights of fish shown in the fish tracks in the subset is stable relative to a second distribution of the weights of fish shown in the fish tracks in the second subset. For example, the weight engine 240 may determine whether the Kolmogorov Smirnoff statistic between weight distributions in the top three hundred fifty fish tracks and the top four hundred fish tracks is less than a threshold.

The process 300 includes outputting the representative weight (340). For example, the weight engine 240 may output the average weight of 1.2 KG to a computer being used by a person for display to the person. In another example, the weight subsystem 104 may output the average weight of 1.2 KG to a harvesting device that determines whether to harvest the fish based on the average weight.

In some implementations, the process 300 includes determining that the representative weight satisfies a harvesting criteria and triggering harvesting of the fish in the fish enclosure. For example, a harvesting device may determine that an average weight of 1.2 KG satisfies a threshold of 1.19 KG and, in response and without human intervention, turn on a harvesting device that directs the fish into another shallower pen where the fish may then be harvested.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A computer-implemented method comprising:
   obtaining, from an underwater camera, images of fish that are enclosed in a fish enclosure;
   identifying, by one or more processors and based on multiple of the images of the fish, fish tracks that each represent a path of a respective fish as the respective fish swims by the underwater camera;
   determining, by the one or more processors, a respective weight estimate for each fish that is associated with a first subset of the fish tracks;
   determining, by the one or more processors, an initial representative weight estimate or an initial estimated distribution of weights for the fish that are enclosed in the fish enclosure based on the respective weight estimates for the fish that are associated with the first subset of the fish tracks, comprising:
      selecting, by the one or more processors, a second subset of the fish tracks from the fish tracks of the first subset,
      determining, by the one or more processors, an updated representative weight estimate for the fish that are enclosed in the fish enclosure based on the respective weight estimates for fish whose fish tracks are included in the second subset, and
      determining, by the one or more processors, that a difference between the initial representative weight estimate and the updated representative weight estimate satisfies a stability criteria; and
   outputting the initial representative weight estimate or the initial estimated distribution of weights for display or storage at a device connected to the one or more processors.

2. The computer-implemented method of claim 1, wherein identifying, by one or more processors, fish tracks comprises:
   determining that a fish shown in a first image of the images is shown in a subsequently captured second image of the images.

3. The computer-implemented method of claim 1, wherein obtaining images of fish comprises:
   instructing a sensor system that includes the underwater camera to capture the images at different depths in the fish enclosure; and
   receiving the images from the underwater camera.

4. The computer-implemented method of claim 1, wherein determining, by the one or more processors, the updated representative weight estimate for the fish that are enclosed in the fish enclosure comprises:
   determining the weights of the fish based on apparent sizes of the fish in the images.

5. The computer-implemented method of claim 1, comprising:
   determining that the output, initial representative weight estimate satisfies a harvesting criteria; and
   triggering harvesting of the fish that are enclosed in the fish enclosure.

6. The computer-implemented method of claim 1, wherein determining, by the one or more processors, that the difference between the initial representative weight estimate and the updated representative weight estimate satisfies the stability criteria comprises:
   determining that the difference between the initial representative weight estimate and the updated representative weight estimate is below a threshold weight.

7. The computer-implemented method of claim 1, wherein determining, by the one or more processors, that the difference between the initial representative weight estimate and the updated representative weight estimate satisfies the stability criteria comprises:
   determining that a first distribution of the weights of fish whose fish tracks are included in the first subset is stable relative to a second distribution of the weights of the fish whose fish tracks are included in the second subset.

8. The computer-implemented method of claim 1, wherein selecting, by the one or more processors, the second subset from the fish tracks comprises:
  determining a ranking of the fish tracks based on a quality score assigned to each fish track; and
  selecting, as the second subset, a predetermined number of the fish tracks based on the ranking.

9. The computer-implemented method of claim 8, selecting, by the one or more processors, the first subset of the fish tracks comprises:
  selecting both a second predetermined number of remaining fish tracks of the fish tracks based on the ranking and the fish tracks in the second subset.

10. The computer-implemented method of claim 1, wherein the initial representative weight estimate comprises an average weight.

11. A system comprising:
  one or more processors and one or more storage devices storing instructions that are operable, when executed by the one or more processors, to cause the one or more processors to perform operations comprising:
    obtaining, from an underwater camera, images of fish that are enclosed in a fish enclosure;
    identifying, by one or more processors and based on multiple of the images of the fish, fish tracks that each represent a path of a respective fish as the respective fish swims by the underwater camera;
    determining, by the one or more processors, a respective weight estimate for each fish that is associated with a first subset of the fish tracks;
    determining, by the one or more processors, an initial representative weight estimate or an initial estimated distribution of weights for the fish that are enclosed in the fish enclosure based on the respective weight estimates for the fish that are associated with the first subset of the fish tracks, comprising:
      selecting, by the one or more processors, a second subset of the fish tracks from the fish tracks of the first subset,
      determining, by the one or more processors, an updated representative weight estimate for the fish that are enclosed in the fish enclosure based on the respective weight estimates for fish whose fish tracks are included in the second subset, and
      determining, by the one or more processors, that a difference between the initial representative weight estimate and the updated representative weight estimate satisfies a stability criteria; and
    outputting the initial representative weight estimate or the initial estimated distribution of weights for display or storage at a device connected to the one or more processors.

12. The system of claim 11, wherein identifying, by one or more processors, fish tracks comprises:
  determining that a fish shown in a first image of the images is shown in a subsequently captured second image of the images.

13. The system of claim 11, wherein obtaining images of fish enclosed in a fish enclosure comprises:
  instructing a sensor system that includes the underwater camera to capture the images at different depths in the fish enclosure; and
  receiving the images from the underwater camera.

14. The system of claim 11, wherein determining, by the one or more processors, the updated representative weight estimate for the fish that are enclosed in the fish enclosure comprises:
  determining the weights of the fish based on apparent sizes of the fish in the images.

15. The system of claim 11, the operations comprising:
  determining that the output, initial representative weight estimate satisfies a harvesting criteria; and
  triggering harvesting of the fish that are enclosed in the fish enclosure.

16. The system of claim 11, wherein determining, by the one or more processors, that the difference between the initial representative weight estimate and the updated representative weight estimate satisfies the stability criteria comprises:
  determining that the difference between the initial representative weight estimate and the updated representative weight estimate is below a threshold weight.

17. A computer-readable storage device encoded with a computer program, the program comprising instructions that when executed by one or more processors cause the one or more processors to perform operations comprising:
  obtaining, from an underwater camera, images of fish that are enclosed in a fish enclosure;
  identifying, based on multiple of the images of the fish, fish tracks that each represent a path of a respective fish as the respective fish swims by the underwater camera;
  determining a respective weight estimate for each fish that is associated with a first subset of the fish tracks;
  determining an initial representative weight estimate or an initial estimated distribution of weights for the fish that are enclosed in the fish enclosure based on the respective weight estimates for the fish that are associated with the first subset of the fish tracks, comprising:
    selecting a second subset of the fish tracks from the fish tracks of the first subset,
    determining an updated representative weight estimate for the fish that are enclosed in the fish enclosure based on the respective weight estimates for fish whose fish tracks are included in the second subset, and
    determining that a difference between the initial representative weight estimate and the updated representative weight estimate satisfies a stability criteria; and
  outputting the initial representative weight estimate or the initial estimated distribution of weights for display or storage at a device connected to the one or more processors.

18. The computer-readable storage device of claim 17, wherein obtaining images of fish comprises:
  instructing a sensor system that includes the underwater camera to capture the images at different depths in the fish enclosure; and
  receiving the images from the underwater camera.

19. The computer-readable storage device of claim 17, wherein determining, by the one or more processors, the updated representative weight estimate for the fish that are enclosed in the fish enclosure comprises:
  determining the weights of the fish based on apparent sizes of the fish in the images.

20. The computer-readable storage device of claim 17, wherein selecting the second subset from the fish tracks comprises:
  determining a ranking of the fish tracks based on a quality score assigned to each fish track; and
  selecting, as the second subset, a predetermined number of the fish tracks based on the ranking.

* * * * *